United States Patent [19]

Hilton

[11] 4,304,376
[45] Dec. 8, 1981

[54] COMPOSITE HONEYCOMB CORE STRUCTURES AND SINGLE STAGE HOT BONDING METHOD OF PRODUCING SUCH STRUCTURES

[75] Inventor: R. John Hilton, Auburn, Wash.

[73] Assignee: The Boeing Company, Seattle, Wash.

[21] Appl. No.: 857,264

[22] Filed: Dec. 5, 1977

[51] Int. Cl.³ .................................................. B64C 3/18
[52] U.S. Cl. ................................. 244/123; 244/117 R; 416/226; 416/233; 428/116
[58] Field of Search .................... 244/117 R, 119, 123; 416/226, 233, 241 A; 428/73, 116, 117, 118, 295, 36; 52/806, 79 S; 156/197

[56] References Cited

U.S. PATENT DOCUMENTS

| | | | |
|---|---|---|---|
| 3,533,894 | 10/1970 | Engelbrecht et al. | 428/118 |
| 3,707,583 | 6/1971 | McKown | 428/118 |
| 3,754,840 | 8/1973 | Zincone | 416/226 |
| 3,768,760 | 10/1973 | Jensen | 244/123 |
| 3,782,856 | 1/1974 | Salkind | 416/226 |
| 3,813,186 | 5/1974 | Palachek | 416/226 |
| 3,883,093 | 5/1975 | Violleau | 244/123 |
| 3,950,115 | 4/1976 | Euler | 244/123 |
| 3,953,641 | 4/1976 | Marquis | 428/295 |
| 4,022,546 | 5/1977 | Drees et al. | 416/226 |
| 4,083,656 | 4/1978 | Braswell | 416/226 |
| 4,136,846 | 1/1979 | Brault | 244/123 |

*Primary Examiner*—Galen L. Barefoot
*Attorney, Agent, or Firm*—Christensen, O'Connor, Johnson & Kindness

[57] ABSTRACT

Composite honeycomb core structures, such as airplane control surface structures, capable of withstanding bending and shear stresses, are disclosed along with a single stage hot bonding process of manufacturing such structures. The composite structures include: a primary load carrying member formed of a high density honeycomb core, two spar caps, each having a predetermined thickness, bonded to opposing surfaces of the high density honeycomb core; a low density honeycomb core bonded to the high density honeycomb core along one edge thereof; and, a skin superposed on, and bonded to, the spar caps and the low density honeycomb core. (In some cases, depending upon the structural strength needed, the high density honeycomb core may be replaced by a low density honeycomb core and formed in a unitary manner with the low density honeycomb core to which the skin is bonded. Or, both can be high density honeycomb cores formed in a unitary manner and machined to the desired shape.) The single stage hot bonding process includes the steps of bonding a low density honeycomb core to a high density honeycomb core, shaping the combined honeycomb core, adhesively attaching spar caps to opposing surfaces of the high density honeycomb core, adhesively attaching a skin to the spar caps and the low density honeycomb core and curing the composite structure in a heated bag mold.

15 Claims, 6 Drawing Figures

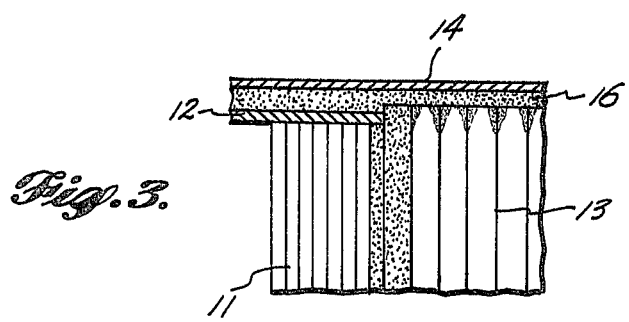
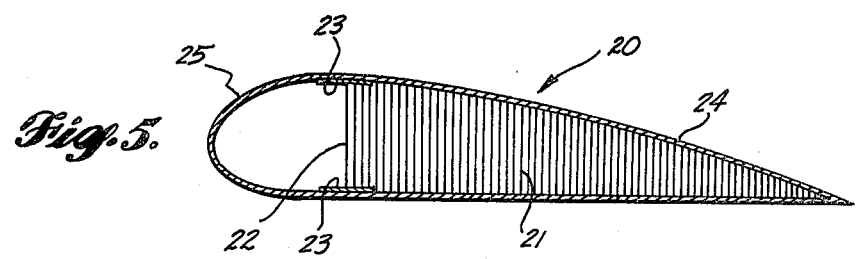
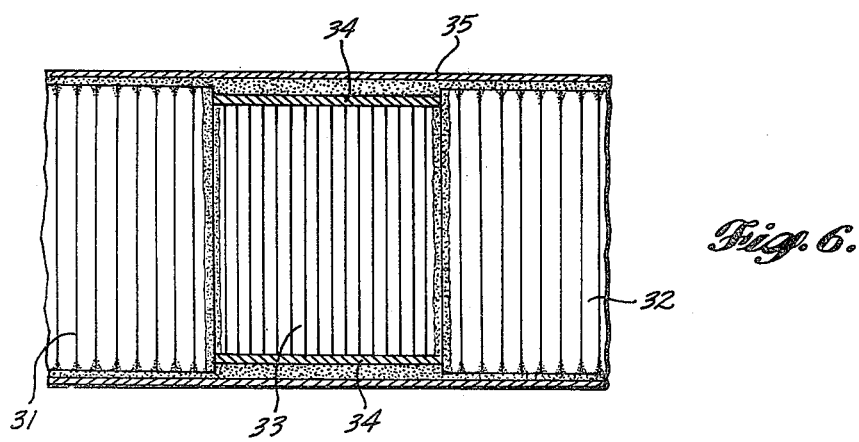

COMPOSITE HONEYCOMB CORE STRUCTURES AND SINGLE STAGE HOT BONDING METHOD OF PRODUCING SUCH STRUCTURES

BACKGROUND OF THE INVENTION

This invention is directed to honeycomb core structures and, in particular, honeycomb core structures that are subjected to bending and shear stresses, such as aircraft control surface structures; and, methods of making such structures.

While the herein described invention was developed for use in the airplane industry by aeronautical engineers and designers, and is described in that environment, it is to be understood that structures formed in accordance with the invention are also useful in other environments. In general, structures formed in accordance with the invention will be useful in many environments requiring bend and/or shear stress resistant panels formed without skin lumps or depressions.

Prior to this invention, solid web, elongated spars were used in many aircraft control surface structures, such as flaps and ailerons to prevent the bending of such structures in a spanwise direction and the shearing of such structures in a chordwise direction. The strength of a solid spar was thought to be required to withstand the bending and shear forces applied to such structures during flight. More specifically, during flight, when airplane control surfaces are in their operative positions, both bending and shear stresses are applied to the control surfaces. These stresses are prevented from damaging the control surface structure by a spar mounted spanwise in the structure. The web of the spar resists both shear stress, which concentrates along the chordwise centerline of the control surface structure, and bending stress, which occurs at right angles to the longitudinal axis of the spar. In essence, therefore, the spar forms a primary load carrying member that resists bend and shear stresses. As noted above, because these stresses are high, in the past, it was thought that a solid web spar was required. Obviously, solid web spars are undesirable because they add unnecessary weight to the control surface structures. Added weight, of course, decreases fuel economy as well as increases the power needed to move the control surfaces. However, the additional weight added by solid spars is not their main disadvantage. The main disadvantage of solid spars is that they cannot be inexpensively produced and still meet exact dimensional requirements. Moreover, solid spars often suffer from web warpage. In the past, these disadvantages have been overcome by bolting or rigidly affixing a spar to a "tooling" platform during the formation of airplane control surface structures. The rigid platform was used to maintain the solid spar in a fixed position (attached to the lower skin) during subsequent forming and bonding steps, hereinafter described.

Turning now to a discussion of the necessity for a solid spar to be precisely formed when used as a strengthening member in a honeycomb core structure (or conversely the necessity that the adjacent honeycomb to be formed in a manner that compensates for spar dimensional variations); it is well known that an adhesive layer located between a skin and a honeycomb core will sink into the porous honeycomb core. As a result, the bonding layer will be thinner than the starting adhesive layer, ignoring any adhesive shrinkage. Conversely, an adhesive layer will not sink or decrease in thickness when applied between a skin and a solid surface, such as the flange of a spar, again ignoring adhesive shrinkage and assuming adhesive is not forced or squeezed out between the solid surfaces. Therefore, when a honeycomb core and a spar flange are joined in a planar manner and a skin applied over the core and the flange, aerodynamically harmful rippling or indentations may occur in the skin surface, if the adhesive used is of uniform thickness. This result can be alleviated by forming the portion of the honeycomb core adjacent the spar such that it has a greater thickness than the spar, i.e. the junction between the core and the spar flange is discontinuous. It is known that this discontinuity should fall between 0.00 and 0.01 inch (average 0.005) if a reliable bond without rippling or identations is to be obtained. In the past, using solid spars, this result has been accomplished using the two stage hot bonding process described below.

In the first stage of a two stage hot bonding process, a lower skin is laid out on the "tooling" platform noted above and an adhesive is applied to the skin surface. The solid spar (usually "C" or I shaped in cross-section) is attached to the skin and bolted in place. Next, the honeycomb core is attached to the web of the spar with an adhesive. At the same time the honeycomb core is attached to the lower skin. Flash tape, protective film and bleeder cloth are placed over the core; and, the structure is sealed in a bag mold and placed in an autoclave to cure the adhesive so that bonds are formed. After the bonds are formed, the protective film, bleeder cloth and the flash tape are removed. In the second stage of this process the exposed honeycomb core is machined to a desired shape. At this time the exposed upper surface of the upper flange of the spar is used as an index point to achieve a 0.005 inch average discontinuity between the upper surface of the spar and the region of the honeycomb core adjacent to the spar. (It is pointed out here that this average discontinuity is extremely difficult to achieve in structures having lengths greater than 10 feet.) After the core is cleaned by a vapor degreasing process, the upper skin is adhesively attached to the core and the spar; and the adhesive is cured in an autoclave so that the upper skin becomes bonded to the core and the spar.

Because of the potential cost savings in man-hours, materials and energy, those skilled in the art have been attempting to find a single stage hot bonding process that can be used to produce reliably bonded aircraft control surface structures, such as flaps and ailerons. One attempted solution ignores the tolerance problem created by the nonuniform dimensions of the spar. In this solution, the honeycomb core was machined such that its outer surface adjacent the spars would be 0.04 inch greater than the outer surface of the spars. The flap or aileron was then assembled in a single stage. During assembly, an extra coating of low flow adhesive was applied on the spars by hand to cover up the mismatching created by the nonuniform dimensions of the spars. Then, the entire assembly was heated in an autoclave to form the adhesive into bond. This attempt to provide a single stage bonding process has a number of disadvantages. Specifically, the use of extra adhesive adds to the weight of the resulting structure. Further, the handwork required to apply the extra adhesive adds manufacturing time and materials and thus increases the cost of the structure. Also, the thick adhesive about the spar area increases the likelihood of leak paths extending to the honeycomb core from the exterior of the structure.

Finally, the bond between the skin and the spar, in the area of extra adhesive, has been found to be unreliable.

Therefore, it is an object of this invention to provide new and improved composite structures suitable for withstanding bending and shear forces.

It is also an object of this invention to provide new and improved honeycomb core structures suitable for withstanding bending and shear forces.

It is another object of this invention to provide new and improved aircraft control surface structures, such as flaps and ailerons, that are lighter in weight than similar prior art structures.

It is a further object of this invention to provide composite structures, such as airplane control surface structures, formed by a single stage hot bonding process.

It is yet another object of this invention to provide a new and improved single stage hot bonding process suitable for forming bend and shear stress resistant composite structures, particularly honeycomb core composite structures.

SUMMARY OF THE INVENTION

In accordance with principles of this invention, composite structures capable of withstanding bend and shear stresses, and formed by a single stage hot bonding process are provided. The composite structures comprise: an elongate primary load carrying member in the form of a high density honeycomb core fitted with spar caps, each having a predetermined thickness, bonded to its upper and lower surfaces; a low density honeycomb core bonded to the high density honeycomb core and the adjacent edges of the spar caps; and a skin bonded to the spar caps and the low density honeycomb core. The thickness of the low density honeycomb core adjacent to the primary load carrying member is greater than the thickness of the primary load carrying honeycomb core plus the spar caps by a predetermined amount. Composite structures of the foregoing type are useful in environments where the structure is to be subject to bend and shear stress, particularly bend stress in a plane's transverse to the longitudinal axis of the primary load carrying member. In particular, such composite structures are admirably suited to form the control surface structures (flaps, ailerons, etc.) of airplanes.

In accordance with further principles of this invention structures, such as short span airplane ailerons, will have adequate structural strength if the honeycomb core between the spar caps is of a density similar to the density of the honeycomb core to which the skin is bonded. In this alternate embodiment, the "spar capped" honeycomb core and the "skin covered" honeycomb core may be formed in a unitary manner, with the capped honeycomb core being reduced in thickness by an amount adequate to compensate for the addition of the spar caps and adequate to compensate for the adhesive thickness differential that occurs when a skin is bonded to a porous surface (honeycomb core) and a nonporous surface (spar cap).

In accordance with further principles of this invention, the composite structures denoted above are made by a single stage hot bonding process. The process comprises the steps of: bonding a primary load carrying member honeycomb core to a skin support honeycomb core (or forming both honeycomb cores in a unitary manner); shaping the composite cores to a desired shape; adhesively attaching spar caps to the upper and lower surfaces of the primary load carrying member honeycomb core; adhesively attaching skin to the low density honeycomb core and the spar caps; and heating the composite structure in a heated bag mold so that the adhesives cure and form bonds.

It will be appreciated from the foregoing brief summary that the invention provides a composite structure that uses spar caps and a honeycomb core to replace solid spars. Strict, uniform tolerance requirements are easily met by this structure because spar caps can be readily manufactured with a predetermined thickness and because honeycomb cores can be readily machined to precise thicknesses. Although the thickness of each spar cap may vary along its length or width, at any one point the thickness is predetermined and uniform for all spar caps manufactured with the same dimensions. Further, because the thickness of spar cap is predetermined, the honeycomb core may be shaped before the spar caps are attached. Also, the entire skin (top and bottom) can be added to the spar cap/honeycomb core substructure prior to the substructure adhesive being cured. Because the entire structure is assembled prior to curing the adhesive, only a single curing step is required. Also, an expensive tooling platform is not required. Further, by eliminating the stops surrounding the first curing of the two stage process (i.e., preparing the structure for curing, and leaving after curing) a substantial amount of "man-hours" are saved. Therefore, composite structures formed in accordance with this invention are substantially less expensive to manufacture than are prior art structures formed using a two stage hot bonding process.

BRIEF DESCRIPTION OF THE DRAWINGS

The foregoing objects and many of the attendant advantages of this invention will become more readily apparent as the same becomes better understood by reference to the following detailed description when taken in conjunction with the accompanying drawings wherein:

FIG. 3 is an enlarged partial view of FIG. 2 and depicts, in an exaggerated manner, the discontinuity between the outer surface of the low density honeycomb core and the outer surface of the spar cap needed to obtain a resultant composite structure having no surface irregularities in its skin created when a skin is bonded to these surfaces;

FIG. 5 is a cross-sectional view of an aileron; and,

FIG. 6 is a cross-sectional view of a composite structure containing two low density honeycomb cores bonded to a high density honeycomb core exaggerated to better illustrate the discontinuity between the outer surfaces of the low density honeycomb core and the outer surfaces of the spar caps and the differential in adhesive thickness.

DESCRIPTION OF THE PREFERRED EMBODIMENTS

FIGS. 1-4 illustrate a composite structure formed in accordance with the invention in the form of an airplane flap 10. The external configuration of the flap is conventional and includes a leading edge adapted to be attached to a main wing structure and a trailing edge adapted to form the trailing edge of the portion of the wing to which the flap is attached. The flap is a composite structure that comprises an internal substructure and a skin that defines the profile of the flap, which forms one of the control surfaces of an airplane. The invention resides in the nature of the internal substructure and in a single stage process of forming the overall flap, or at least the trailing edge portion thereof. In addition to flaps, the invention can also be used to form other control surface structures, such as ailerons, fixed trailing edge wedges, or other wedge shaped structure.

Figure 1:
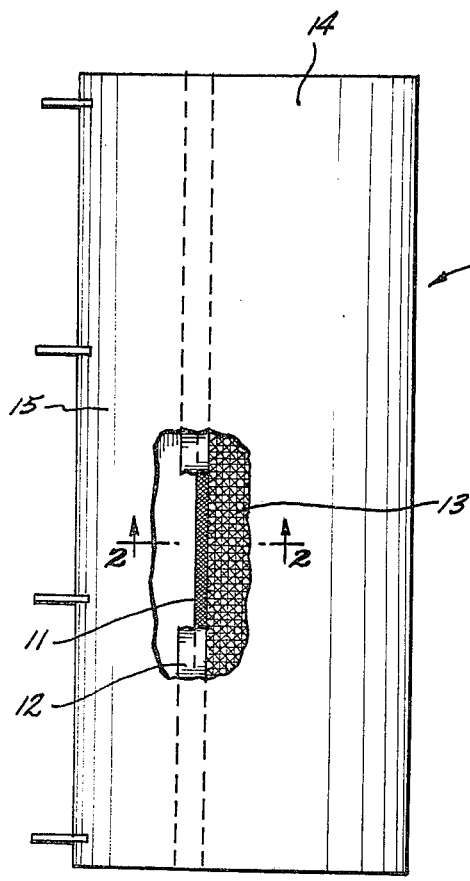
FIG. 1 is a plan view of an airplane flap partially broken away to show the lattice structure of high density and low density honeycomb cores.
Figure 4:
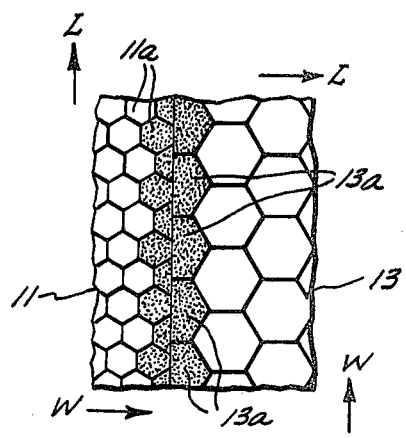
FIG. 4 is a partial enlarged plan view of the lattice-structure taken along line 4—4 of FIG. 2.
Figure 2:
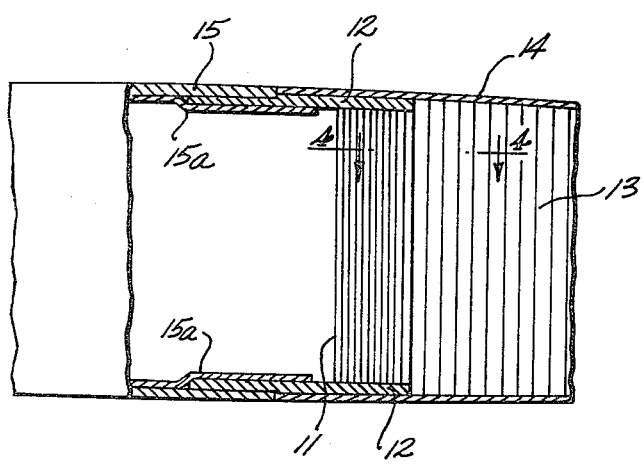
FIG. 2 is a partial cross-sectional view taken along line 2—2 of FIG. 1.

The internal substructure illustrated in FIGS. 1-4 and formed in accordance with the invention comprises an elongate high density honeycomb core 11 extending spanwise across the flap 10 along generally the same longitudinal line as the web of a solid spar of a prior art flap of the same configuration. The high density honeycomb core is a conventional L/W lattice honeycomb core positioned such that the L direction is spanwise, the W direction is chordwise and the open direction is vertical, as best illustrated in FIG. 4. Bonded to the top and bottom of the high density honeycomb core, in the spanwise direction are elongate, flat spar caps 12. The spar caps have a uniform thickness and are attached such that one longitudinal edge of the caps is coplanar with the trailing edge side of the high density honeycomb core. As a result, the high density honeycomb core and the spar caps are C-shaped when viewed in cross-section.

The spar caps and the high density honeycomb core form a primary load carrying member adapted to replace the solid web spars used in prior art flaps. If adequately dense, the high density honeycomb core has been found strong enough to remain rigid under abnormal spanwise blending loads and abnormal chordwise shear stresses. Such loads and stresses have been restrained up to over 200% of ultimate design loads. Adequate density ranges for the high density honeycomb core are set forth below.

Bonded to the trailing edge side of the primary load carrying member formed by the composite high density honeycomb core/spar cap element is a low density honeycomb core 13. The low density honeycomb core also has an L/W lattice; however, in this instance, the L direction is chordwise and the W direction is spanwise. As with the high density honeycomb core, the open direction of the low density honeycomb core is vertical.

A bonding adhesive fills the "open" cells 11a and 13a of the honeycomb cores in the facing plane, as denoted by the speckles in these cells in FIG. 4. The outer, open cell walls of the low density honeycomb core define the outer periphery of the trailing edge portion of the flap 10. More specifically, the open cell surfaces of the low density honeycomb core define the profile of the portion of the flap rearwardly from the primary load carrying member to the trailing edge of the flap, in a manner similar to the low density honeycomb cores used in prior art flaps.

As discussed in the introductory portion of this application, in order to avoid the formation of lumps and depressions, when a skin 14 is added to a substructure comprising contiguous porous (honeycomb) and nonporous (spar cap) regions, it is necessary that a discontinuity exist between these regions. As best illustrated in FIG. 3, this discontinuity is provided by making the low density honeycomb core thicker than the combined thickness of the spar caps and the high density honeycomb core where they join. Then, when an adhesive layer 16 is applied between skin 14 and the internal substructure (spar cap 12 and low density honeycomb core 13), the discontinuity between spar cap 12 and low density honeycomb core 13 compensates for the unavoidable sinking of the adhesive 16 into the porous honeycomb core. While the discontinuity dimension between the outer surfaces of the spar caps and the low density honeycomb core can vary depending upon the size of the cells of the honeycomb core and the properties of the adhesive, for an airplane flap useful on a modern commercial jet (such as the 727 sold by The Boeing Company, Seattle, Wash.) an average dimension of 0.005 inch is suitable. More specifically, the discontinuity between the bottom spar cap and the lower surface of the low density honeycomb core and the top spar cap and the upper surface of the low density honeycomb core can vary between 0.00 inch and 0.01 inch as long as the average is approximately 0.005 inch. The present invention, thus, does not alleviate the need for the discontinuity. Rather, the invention provides a primary load carrying member that replaces the solid spars used in prior art flaps. There are several advantages to using a primary load carrying member formed of a high density honeycomb core and pair of spar caps in place of a solid web spar. First, depending on the size (width) and density of the high density honeycomb core a weight reduction can be achieved while adequate strength is retained. Second, and more importantly, the primary load carrying member can be inexpensively formed to exacting dimensional requirements, i.e such members can be held within strict tolerance limits without becoming unduly expensive. Contrariwise, it is difficult for solid spars to meet the same requirements and, even if solid spars can be formed to the required dimensions, the cost of forming such spars is prohibitive. Thirdly, because the primary load carrying member is precisely sized, the overall composite structure (e.g. flap) can be formed by a single stage hot bonding process described in detail below.

The flap 10 illustrated in FIGS. 1-4 is completed by a leading edge or nose structure 15 that is attached to the forwardly projecting portions of the spar caps 12. Since the thickness of the material used to form the nose is usually thicker than the skin 14, the forwardly projecting portions of the spar caps are illustrated as undercut. As a result, a flush joint is created on the outer surface of the flap. Further, for reinforcement purposes, plates 15a are illustrated as located on the inner side of the flap so as to overlie the forward edge of the spar caps and the adjacent surfaces of the spar caps and the nose structure 15. Preferably, the nose structure is attached by rivets, even though other attachment devices can be used, as desired.

In some environments, a composite structure may be adequately strong if the honeycomb core of the primary load carrying member has a density (low) similar to the density of the skin supporting honeycomb core. In such a case, the honeycomb core of the primary load carrying member and the honeycomb core supporting the skin can be formed in a unitary manner and machined to the correct configuration. Alternatively, if the skin supporting honeycomb core needs to be more dense to provide additional strength, a unitary high density honeycomb core can be machined to form both the skin core and the primary load carrying member core. An example of a composite structure (aileron) wherein both honeycomb cores have the same density and are formed in a unitary manner is illustrated in FIG. 5. More specifically, FIG. 5 is a cross-sectional view of an aileron 20 having a unitary honeycomb core 21. The unitary honeycomb core 21 is machined or formed so as to have a trailing edge region in the shape of the trailing edge portion of the aileron 20; and, a leading edge region 22 that faces the leading edge of the aileron, but is spaced therefrom. The leading edge region 22 is undercut on its upper and lower surfaces by an amount adequate to provide the heretofor discussed discontinuity after top and bottom spar caps 23 are bonded to the undercut areas. The spar caps project outwardly from the leading edge region 22 of the honeycomb core 21. As with the composite structure (flap) illustrated in FIGS. 1–4 and heretofor described, a skin 24 is bonded to the spar caps and the trailing edge region of the unitary honeycomb core. Further, a U-shaped leading edge 25 is riveted to the forwardly projecting portion of the spar caps 23.

In some composite structures, it may be necessary for a skin supporting honeycomb core to extend outwardly from opposing sides of the honeycomb core of the primary load carrying member. Such structures may be airplane control surface structures, light weight panels, etc. FIG. 6 is a cross-sectional view illustrating a panel embodiment of the invention wherein skin supporting low density honeycomb cores 31 and 32 extend outwardly from an elongate high density honeycomb core 33 to which the low density cores are bonded. Bonded to the high density honeycomb core 33 are top and bottom spar caps 34. Again, the combined height of the high density honeycomb core and the spar caps (which form a primary load carrying member) is slightly less (shown exaggerated in FIG. 6) than the height of the adjacent regions of the low density honeycomb cores 31 and 32. Bonded to the spar caps and the exposed adjacent surfaces of the low density honeycomb cores 31 and 32 is a skin 35. It is pointed out that in this embodiment of the invention the high density honeycomb core width and the width of the spar caps 34 is the same. Thus, the spar caps do not extend beyond one side of the high density honeycomb core, as in previously described embodiments of the invention. In this regard, if necessary or desired, the honeycomb cores of the primary load carrying members of the previously described embodiments of the invention can also fill the entire region between the spar caps. Further, while the embodiment of the invention illustrated in FIG. 6 and heretofor described includes a high density honeycomb core as part of the primary load carrying member, as with the previously described embodiments of the invention, the density of the skin supporting and primary load carrying honeycomb cores can be the same, either high or low. Further, if the same density, the honeycomb cores can be formed in a unitary manner.

The honeycomb cores, spar caps and skins may be formed of various materials, such as aluminum, aluminum alloy, titanium, titanium alloy, steel, steel alloys, glass fiberglass or other fiber reinforced synthetic resins, paper products or high temperature nylons such as polyamides (marketed under the trade name "Nomex") depending upon how the resulting composite structure is to be used. The adhesive used for bonding may be epoxies, acrylic polymers, phenolics or any nonvolatile adhesive adequate to provide the necessary bond strength.

As known by those skilled in the art, standard aluminum alloy L/W honeycomb core is catagorized by its density. As used herein, low density honeycomb core in this context has a density between 2.1 and 4.5 pounds per cubic foot; and, high density honeycomb core has a density between 7.1 and 55 pounds per cubic foot.

By way of example, an actual inboard flap for an airplane (Boeing 727) formed in accordance with the invention using standard aluminum aircraft alloys included a primary load carrying member having a high density honeycomb core with a density of 12 pounds per foot and formed 2/16 inch cells having a wall thickness of 0.003 inches, a width of 0.75 inches, a height of approximately 2.5 inches and a length of approximately 15 feet. The skin supporting low density honeycomb core had a density of 3.1 lbs/ft$^3$ and was formed of 3/16 inch cells having a wall thickness of 0.001 inches, a height of approximately 2.5 inches at the interface between the high and low density honeycomb cores, a width of approximately 14.8 inches and a length of approximately 15 feet. The spar caps were 0.10 inch thick, 2.0 inches wide and approximately 15 feet long; and the upper skin was 0.012 inches thick and the lower skin was 0.016 inches thick. The adhesive used was a moderate heat curing modified epoxy; the modified epoxy is obtainable from American Cyanide as modified epoxy FM-73, or from Hysol Corporation epoxy number 9628. Adhesive thickness between the skin and the spar caps, between the skin and the low density honeycomb core, and between the spar caps and high density honeycomb core was 0.01 inch. Adhesive thickness between the high and low density honeycomb cores was 0.05 inch.

In some instances it may be preferable to vary the density within either of the cores, depending on the strength that is needed. For example, in flaps used in the Boeing 737 airplane the density of the core of the primary load carrying member is about 12 pounds per cubic foot. This density increases to 21 pounds per cubic foot where actuators are fixed to the primarly load carrying member.

The single stage hot bonding process of the invention used to form composite structures of the invention generally involves assembling the primary load carrying member, the skin supporting honeycomb core and the skin; and, heating the assembly in an oven. Prior to assembly, the honeycomb core or cores are shaped by machining their outer surfaces with a router having a valve stem cutter blade, for example. Because the spar caps have a uniform, predetermined thickness, the discontinuity between the adjacent surfaces of the primary load carrying member and the low density (skin supporting) honeycomb core can be formed with precision to insure that correct spacing between these surfaces is strictly maintained. Assuming that the composite structure is to be a flap, the low density honeycomb core is also machined at this time to the desired aerodynamic contour. The lower skin (of the flap) is then laid out on a tooling surface and adhesive is applied to the exposed side of the skin. The lower spar cap is positioned and placed on the skin in the appropriate position. Next, the portion of the exposed surface of the lower spar cap that will contact the high density honeycomb core is coated with an adhesive. The previously bonded (or unitarily formed) primary load carrying member honeycomb core and the low density honeycomb core is placed on the lower skin and the lower spar cap. The upper spar cap is then attached to the primary load carrying member honeycomb core with an adhesive; and, the upper skin is attached to the exposed surface of the low density honeycomb core and the upper spar cap with an adhesive. The assembled flap structure is then sealed in a bag mold and the adhesive is cured in a heated autoclave. When a moderate heat curing modified epoxy is used as the adhesive, the autoclave temperature is preferrably about 250° F.

The assembly steps of the foregoing process are meant to be construed as exemplary, not limiting, since they can be varied. For example, the honeycomb cores may be individually machined to their desired shapes, the two spar caps attached to the primary load carrying member honeycomb core with adhesive, the skin supporting honeycomb core attached to the primary load carrying member honeycomb core and the spar caps with adhesive and, then, the skins attached. This alternative series of assembly steps eliminates the need to bond the honeycomb cores together prior to curing the adhesives of the entire assembly.

While preferred embodiments of composite structures wherein a honeycomb core replaces the web of a solid spar and a single stage bonding process for making such structures have been described, it will be appreciated by those skilled in the art that various changes can be made therein without departing from the spirit and scope of the invention. For example, many of the assembly steps of the single stage hot bonding process are interchangeable. Thus, these steps may be performed in various sequences. Further composite structures other than flaps and ailerons can be formed. Depending upon various strength requirements and the type of structures to be attached, the spar caps may vary in thickness. However, the thickness of each spar cap at any one point must be known and uniform for all spar caps having the same shape, and the discontinuities between the outer surface of the spar caps and the outer surface of the low density honeycomb core adjacent to the spar cap must be maintained. Hence, the invention can be practiced otherwise than as specifically described herein.

The embodiments of the invention in which an exclusive property or privilege is claimed are defined as follows:

1. An airplane control surface structure comprising:
    (a) a primary load carrying member comprising an elongate honeycomb core and first and second spar caps bonded to opposing edges of said elongate honeycomb core, said elongate honeycomb core being continuous in the direction extending between said first and second spar caps, said elongate honeycomb core and said first and second spar caps bearing the major portion of the shear stress applied to said airplane control surface structure;
    (b) an airplane control surface defining honeycomb core affixed to one side of said primary load carrying member such that a predetermined average discontinuity exists between adjacent surfaces of said primary load carrying member and said control surface defining honeycomb core with said control surface defining honeycomb core exceeding in height said primary load carrying member, said control surface defining honeycomb core having an outer surface that defines the trailing edge region of an airplane control surface;
    (c) a skin superimposed over and bonded to the outer surface of said airplane control surface defining honeycomb core and said spar caps; and,
    (d) a leading edge affixed to said spar caps on the side of said primary load carrying member opposed to the side affixed to said airplane control surface defining honeycomb core.

2. The airplane control surface structure of claim 1 wherein the discontinuity between the adjacent surfaces of said primary load carrying member and said surface defining honeycomb core lies between 0.00 and 0.01 inch, with an average of 0.005 inch.

3. The airplane control surface structure of claim 2 wherein said honeycomb cores have a lattice having an "L" shape in one direction and a "W" shape in a perpendicular direction.

4. The airplane control surface structure of claim 3 wherein the "L" shape direction of the elongate honeycomb core of the primary load carrying member is spanwise.

5. The airplane control surface of claim 4 wherein the "L" shape direction of the control surface defining honeycomb core is chordwise.

6. The airplane control surface structure of claim 1 wherein said elongate honeycomb core of said primary load carrying member has a density substantially greater than the density of said control surface defining honeycomb core.

7. The airplane control surface structure of claim 6 wherein said honeycomb cores have a lattice having an "L" shape in one direction and a "W" shape in a perpendicular direction.

8. The airplane control surface structure of claim 7 wherein the "L" shape direction of the elongate honeycomb core of the primary load carrying member is spanwise.

9. The airplane control surface of claim 8 wherein the "L" shape direction of the control surface defining honeycomb core is chordwise;

10. The airplane control surface structure of claim 1 wherein the density of said elongate honeycomb core of said primary load carrying member and the density of said control surface defining honeycomb core are the same.

11. The airplane control surface structure of claim 10 wherein said honeycomb cores have a lattice having an "L" shape in one direction and a "W" shape in a perpendicular direction.

12. The airplane control surface structure of claim 11 wherein the "L" shape direction of the elongate honeycomb core of the primary load carrying member is spanwise.

13. The airplane control surface structure of claim 10 wherein said elongate honeycomb core of said primary load carrying member and said control surface defining honeycomb core are formed in a unitary manner.

14. The airplane control surface structure of claim 13 wherein said honeycomb cores have a lattice having an "L" shape in one direction and a "W" shape in a perpendicular direction.

15. The airplane control surface structure of claim 14 wherein the "L" shape direction of the elongate honeycomb core of the primary load carrying member is spanwise.

* * * * *